Aug. 6, 1968  V. M. LEONARD  3,395,600
APPARATUS OF KEYBOARD INSTRUCTION
Filed May 12, 1966  3 Sheets-Sheet 1

INVENTOR.
VERNA M. LEONARD
BY Kimmel, Crowell & Weaver
ATTORNEYS.

INVENTOR.
VERNA M. LEONARD
BY Kimmel, Crowell & Weaver
ATTORNEYS.

United States Patent Office 3,395,600
Patented Aug. 6, 1968

3,395,600
APPARATUS OF KEYBOARD INSTRUCTION
Verna M. Leonard, 4575 E. Ventura Ave.,
Fresno, Calif. 93702
Filed May 12, 1966, Ser. No. 549,714
10 Claims. (Cl. 84—478)

ABSTRACT OF THE DISCLOSURE

A device for facilitating keyboard instruction for placement behind the keys of a piano or the like wherein a rotatable disc having indicia thereon is provided for indicating the key in which an exercise is to be played. The key designating indicia register with an opening related to a base indicia which is positioned immediately above the base key. A plurality of supplementary indicia indicate the remaining keys of the chord or scale which correspond to the key in which the exercise is played.

---

This invention relates to an apparatus of keyboard instruction and more particularly to a device which may be placed immediately above the keyboard of a piano, organ or other similar instrument, for indicating to the student the particular keys to be struck in the teaching of scales or chords.

There are three well-known manners for designating the keys on a conventional keyboard, the chromatic scale, the half step-whole step method, and the degree approach. In using the chromatic scale each key, whether black or white, is counted or given a number, while in the half step-whole step method, the moving from a designated key to the next adjacent key is designated a half step. For example, moving from E to E-flat is a half step, while moving from E to F is also a half step. In using the degree approach, only the notes of the particular scale used constitute a degree. For example, the degrees of C major are C, D, E, F, G, A, B and C, while the degrees of E-flat are E-flat, F, G, A-flat, B-flat, D, C, and E-flat. Although these different methods of designating keys produce essentially the same result, it will be apparent that there is a certain amount of language difficulty in changing over from one system to another.

It is an object of the instant invention to provide a number of keyboard indicators which may be placed behind the keys of a keyboard instrument to indicate the appropriate keys to be struck for given chords or scales.

It is another object of the instant invention to provide a keyboard instruction device having means for designating the key or signature in which the exercise is to be played.

Another object of the instant invention is to provide a keyboard instruction device in which a rotatable wheel carrying a plurality of indicia designating the key in which the exercise is to be played is mounted on a planar sheet of material positionable behind the keys of the keyboard instrument.

A further object of the instant invention is to provide a keyboard instruction device of the character described in which a plurality of indicia are positioned along one longitudinal edge thereof for indicating the keys to be played therein.

A still further object of the instant invention is to provide a keyboard instruction device having a base indicia immediately below the designator of the key in which the exercise is to be played.

Still another object of the instant invention is to provide a keyboard instruction device in which a plurality of supplementary indicia are spaced from the base indicia for designating the remaining keys to be played.

Other objects and advantages of the instant invention reside in the combinations of elements, arrangements of parts, and features of construction and utilization, all as will be more fully pointed out hereinafter and disclosed in the accompanying drawings wherein there are shown preferred embodiments of this inventive concept.

Figure 1:
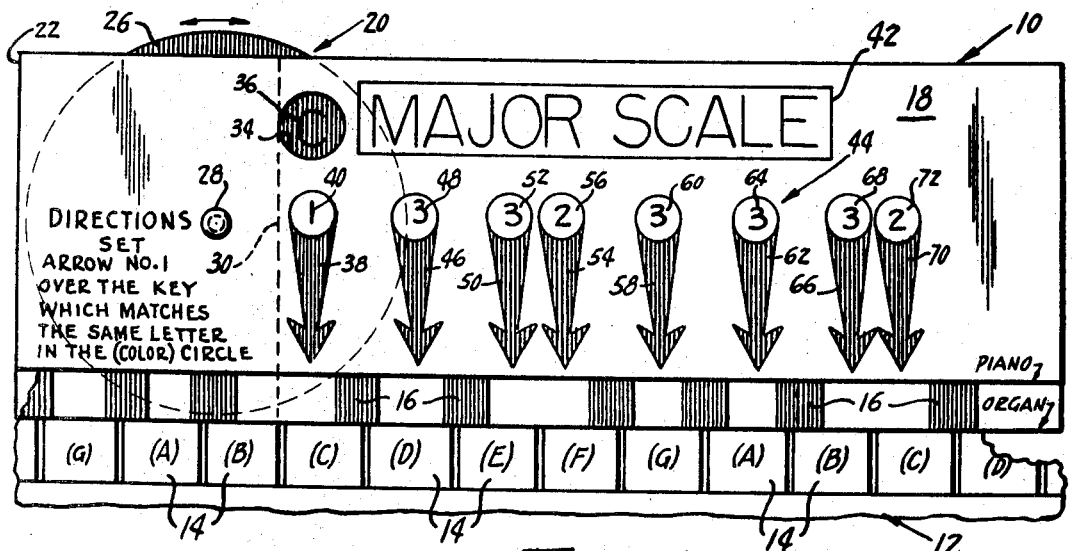
FIGURE 1 is a front elevational view of the keyboard instruction device positioned behind the keys of a keyboard instrument.
Figure 2:
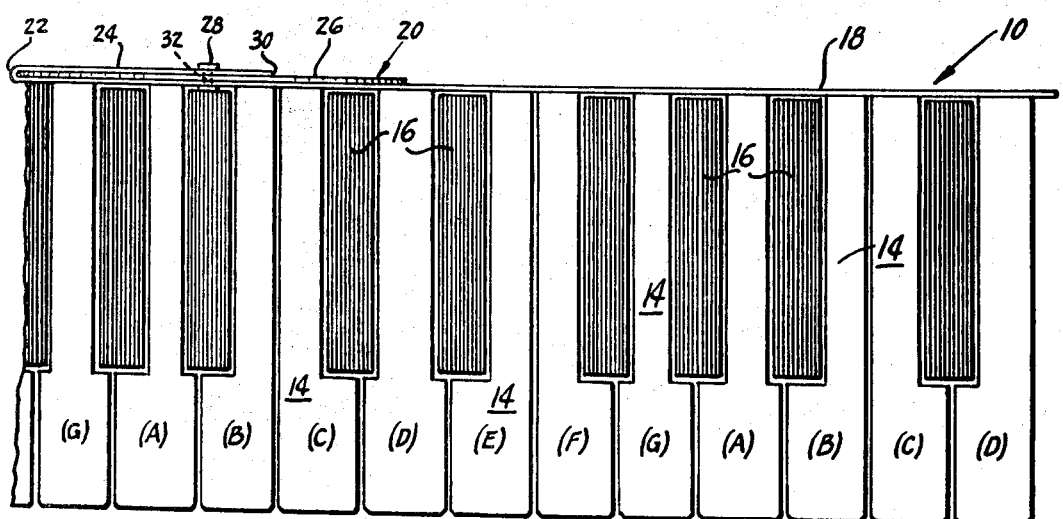
FIGURE 2 is a top plan view of the keyboard instruction device and keyboard instrument of FIGURE 1.

Referring now to the drawings in detail, wherein like reference character designated like elements throughout the several views thereof, and more particularly to FIGURES 1 and 2, the keyboard instruction device of the instant invention is designated generally at 10, positioned between the keys and the key bed of a keyboard instrument shown generally at 12. Instrument 12 is provided with a plurality of longitudinally spaced white keys 14 designating the naturals and a plurality of black keys 16 designating the sharps and flats in a conventional configuration. Keyboard instruction device 10 has as its major components a planar sheet of material 18 positioned behind keys 14, 16 and in front of the key bed of the instrument and a key selection device shown generally at 20.

As will be explained in greater detail hereinafter, key selection device 20 will be manipulated to expose an indicia which designates the key in which the exercise is to be played. Keyboard instruction device 10 is then slidably moved behind keys 14 16 until the leftmost indicia is aligned with the key in which the exercise is to be played. The supplementary indicia, to the right of the leftmost indicia, designate the remaining keys to be played by the student. In the keyboard instruction device of FIGURE 1, the exercise is the playing of the major scale which the student may conduct by sequentially striking the keys designated by the several indicia.

Figure 3:
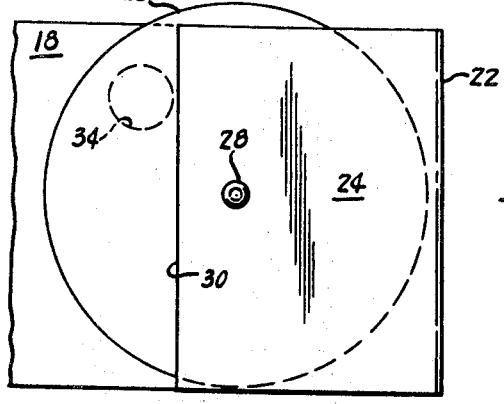
FIGURE 3 is a rear fragmentary view of the keyboard instruction device of FIGURES 1 and 2.

As may be seen best in FIGURES 1 to 3, inclusive, planar sheet 18 is folded along a transverse fold line 22 to form a reverted end 24 which extends only a short distance from fold line 22, as may be seen in FIGURE 3. Key selection device 20 includes a disc 26 sandwiched between planar sheet 18 and reverted end 24 by a rivet 28 or other suitable axle forming member. It should be noted that the diameter of disc 26 is slightly greater than the transverse dimension of planar sheet 18 to expose the upper end of disc 26 to allow an individual to readily rotate it about the central axis. It should also be noted that axle-forming member 28 is positioned above the longitudinal center line of planar sheet 18 and passes through the geometric center of disc 26.

In interest of conserving the material of which planar sheet 18 is made, the terminus 30 of reverted end 24 lies between axle 28 and that portion of the circumference of disc 26 furthest spaced from transverse fold line 22. In order to allow disc 26 to freely rotate about axle 28, disc 26 forms a central aperture 32 slightly larger than the diameter of axle 28. Planar sheet 18 forms an opening 34 spaced from axle 28 less than the radius of disc 26 in order to expose a single indicia 36 of a plurality of indicia formed on disc 26 and equally spaced from axle 28. It will be apparent that rotation of disc 26 about axle 28 will expose a selected indicia 36 which corresponds to the key in which the exercise is to be played.

Spaced immediately below opening 34 is a base indicia 38 illustrated as a vertical arrow with a numerical indicia 40 lying between base arrow 38 and opening 34. As indicated by a title 42 on planar sheet 18, keyboard instruction device 10 is particularly adapted to be utilized to instruct a student in the playing of a major scale by which is meant the sequential striking of keys of increasingly higher note. As may be seen in FIGURE 1, disc 26 is positioned such that key designating indicia 36 indicates that the key in which the exercise is to be played is in the key of C. The student will slide planar sheet 18 along the key bed of the instrument such that arrow 38 points at the key designated by indicia 36. Accordingly, base arrow 38 is shown as pointed at key 14 which designates C.

Keyboard instruction device 10 is prepared illustrating the whole step-half step method of key designation with a plurality of supplementary indicia shown generally at 44 being spaced toward the right from base indicia 38. The major scale of any key may be determined in the half step-whole step method by starting from the base key and taking a whole step, another whole step, a half step, a whole step, another whole step, and another whole step followed by a half step. In determining which keys are to be struck, it should be remembered that the position from a given key to the next adjacent key is a half step. As may be seen in FIGURE 1, a movement from C to C sharp is a half step and the movement from C sharp to D is a half step.

Supplementary indicia 44 includes a first key indicia 46 designated as an arrow with a numerical indicia 48 immediately thereabove with first supplementary indicia 46 being a whole step from base indicia 38. A second supplementary indicia 50 is positioned a whole step from first supplementary indicia 46 with a numerical indicia 52 immediately thereabove. A third supplementary key indicia 54 is positioned a half step from second key indicia 50 and is provided with a numerical indicia 56 immediately thereabove. In starting the play of the scale of C major, the student will strike in sequence the keys designated by base indicia 38, first key indicia 46, second key indicia 50, and third key indicia 54.

A fourth supplementary key indicia 58 is positioned a whole step from third supplementary indicia 54 and is provided with a numerical indicia 60 immediately thereabove. A fifth key indicia 62 is spaced a whole step from fourth key indicia 58 and is provided with a numerical indicia 64 immediately thereabove and is followed by a sixth key indicia 66 having a numerical indicia 68 thereabove. The last or seventh key indicia 70 is spaced a half step from sixth supplementary key indicia 66, and is provided with a numerical indicia 72 immediately thereabove.

Upon inspection of FIGURE 1, it will be immediately apparent that base indicia 38 and supplementary indicia 44 designate the particular notes which are to be played by the student with the sequence being indicated by the lateral spacing thereof. The numerical indicia immediately above base indicia 38 and supplementary indicia 44 indicate the number of counts to be made when utilizing keyboard instruction device 10 in the half step scale. For example, moving from C to D in this approach scale is a total of three half steps since C is one, C sharp is two, and D is three and is designated by numerical indicia 40, 48. The movement from D to E is similarly three counts since D is one, D sharp is two, and E is three.

It should be apparent that the same placement of base indicia 38 and supplementary indicia 44 will result in the playing of a particular scale when using the degree approach or chromatic scale of key counting. When it is desirous to play another scale of a major key, disc 26 may be rotated until the appropriate indicia 36 appears through opening 34. The student will then slide planar sheet 18 along the key bed of the instrument until base indicia 38 is immediately above the key visible through opening 34. The supplementary indicia will then designate the remaining keys to be struck.

Figure 4:
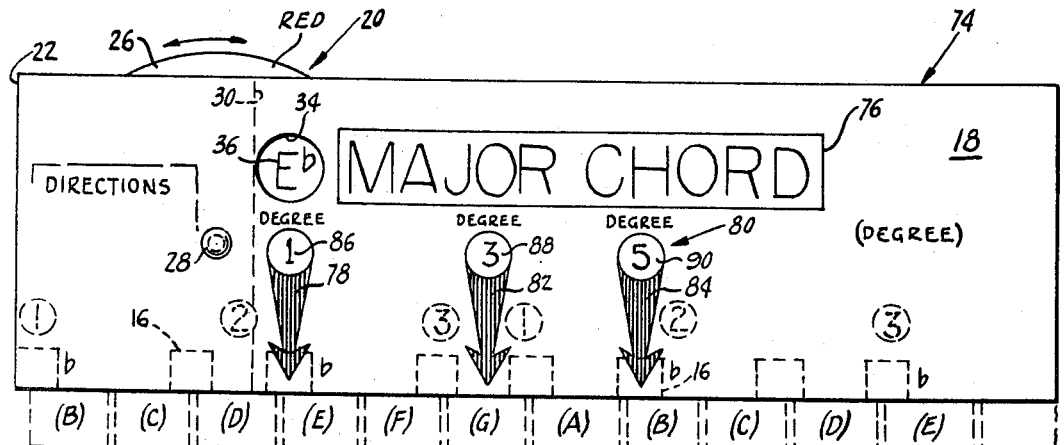
FIGURE 4 is a front elevational view of another form of keyboard instruction device made in accordance with the principles of the instant invention for designating the appropriate keys to be struck to sound a major chord.

Referring now to FIGURE 4, another form of keyboard instruction device is shown generally at 74 which is utilized to designate the keys to be struck to sound a major chord as indicated by title 76. For purposes of brevity, identical reference characters are used to designate like components which have been previously mentioned. A base indicia 78, shown as a vertical arrow, is positioned immediately below opening 34 and will be aligned with the key denominated by key designating indicia 36 visible through opening 34. A pair of supplementary indicia shown generally at 80 are positioned to the right of base indicia 78. Supplementary indicia 80 include a first supplementary indicia 82 spaced two degrees from base indicia 78 and a second supplementary indicia 84 spaced two degrees from first supplementary indicia 82.

A numerical indicia 86, 88, 90 is positioned above each of indicia 78, 80, 82 to designate the degree of the keys to which arrows 78, 82, 84 point. In the utilization of keyboard instruction device 74, wheel 26 will be rotated until the desired key designating indicia 36 appears through opening 34 at which time the student will slide planar sheet 18 such that base indicia 78 points at the key designated by indicia 36. Supplementary indicia 80 will then designate the remaining keys to be struck simultaneously by the student. It should be apparent that keyboard instruction device 74 may be arranged in the chromatic or half step-whole step approach with numerical indicia 86, 88, 90 reflecting these latter approaches.

Figure 5:
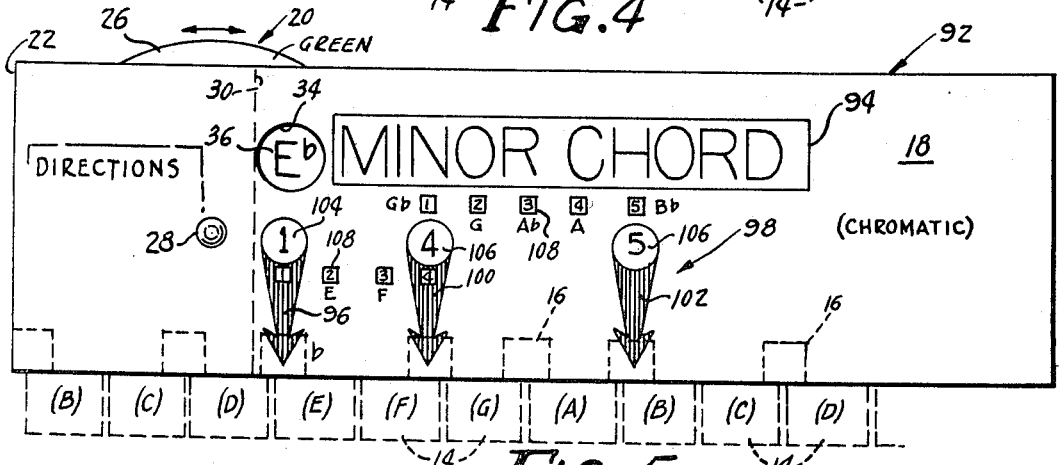
FIGURE 5 is a front elevational view of still another form of keyboard instruction device made in accordance with the principles of the instant invention for designating the keys to be struck to sound a minor chord.

Referring now to FIGURE 5, another embodiment of the instant invention is illustrated generally at 92 for designating the keys to be struck in the production of a minor chord as indicated by title 94. For purposes of brevity, like reference characters are used to illustrate components of the instant embodiment which have been previously discussed elsewhere. Immediately below opening 34 is a base indicia 96 which is utilized to position planar sheet 18 correctly in accordance with the key denominated by key designating indicia 36.

A pair of supplementary indicia shown generally at 98, including a first supplementary indicia 100 positioned four spaces on the chromatic scale from base indicia 96 and a second supplementary indicia positioned five spaces on the chromatic scale from first supplementary indicia 100. The numerical indicia 104, 106, 108 is positioned immediately above each of the arrows to designate the number of spaces on the chromatic scale in conjunction with a plurality of counting indicia 108 disposed between each of indicia 96, 100, 102.

When the student is desirous of playing a minor chord, he will rotate disc 26 until the appropriate key designating indicia 36 appears through opening 34. The student will then slide planar sheeet 18 until base indicia 96 points at the key denominated by key designating indicia 36 and simultaneously strike the keys at which indicia 96, 100, 102 point. In the event that it is desired to utilize either the half step-whole step or the degree approach in the construction of keyboard instruction device 92, it will be apparent that numerical indicia 104, 106 and counting indicia 108 may be suitably changed to achieve this result.

Figure 6:
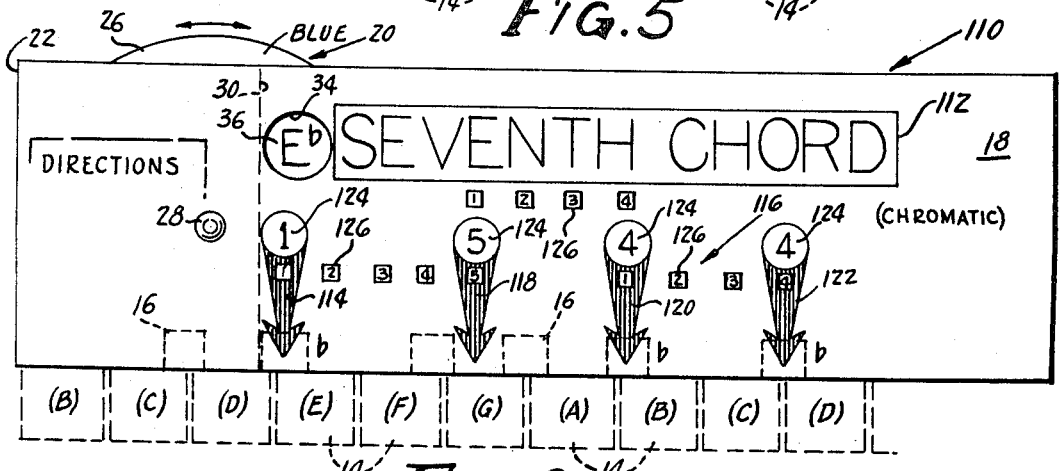
FIGURE 6 is a front elevational view of another embodiment of the keyboard instruction device of the instant invention designating the keys to be struck to sound a seventh chord.

Referring now to FIGURE 6, another form of the instant invention is shown generally at 110 for designating the keys to be struck in the production of a seventh chord as indicated by title 112. Keyboard instruction device 110 includes a base indicia 114, illustrated as a vertical arrow, disposed immediately below opening 36 and a plurality of supplementary indicia shown generally at 116. Suppplementary indicia 116 include a first supplementary indicia 118 located five spaces on the chromatic scale from base indicia 114, a second supplementary indicia 120 located four spaces on the chromatic scale from first supplementary indicia 118, and a third supplementary indicia 122 positioned four spaces on the chromatic scale from second supplementary indicia 120.

Keyboard instruction device 110 includes a plurality of numerical indicia 124 each of which is positioned immediately above indicia 114, 118, 120, 122 for designating the number of spaces on the chromatic scale between each of the arrows. In order to graphically illustrate the spaces between each of the arrow-like indicia, a plurality of counting indicia 126 are provided between each of indicia 114, 118, 120, 122. When it is desired to strike the seventh chord, the student will rotate disc 22 until the desired key is denominated through opening 34. The student will then slide planar sheet 18 along the key bed until base indicia 114 points to the key denominated by key designating indicia 36 and will then simultaneously strike the keys designated by base indicia 114 and supplementary indicia 116. In the event that it is desired to utilize the half step-whole step or the degree approach in the construction of keyboard instruction device 110, it will be apparent that numerical indicia 124 and counting indicia 126 may be so modified.

Figure 7:
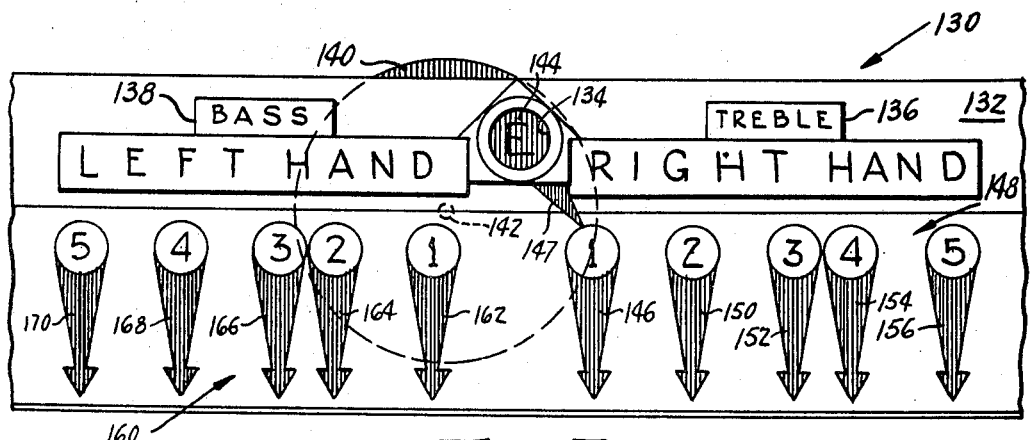
FIGURE 7 is a front elevational view of another embodiment of the instant invention designating the keys to be struck sequentially with both hands to play a major scale exercise.

Referring now to FIGURE 7, another form of the keyboard instruction device of the instant invention is shown generally at 130 and comprises a planar sheet of material 132 forming an opening 134. A rightmost title section 136 and a leftmost title section 138 designate that keyboard instruction device 130 is arranged to designate the appropriate keys to be struck along the first octave above and below the key of middle C. In providing such designations, the student will be able to play with both hands. The now customary rotatable disc 140 is mounted on a pivot pin 142 and is provided with a plurality of scale-designating indicia 144 registering with opening 134.

A base indicia 146 is placed below opening 134 to designate the key in which the exercise is to be played with a transferal arrow 147 drawing the student's attention from opening 134 directly to base indicia 146. The first series of supplementary indicia shown generally at 148 designate the keys to be struck by the right hand. Supplementary indicia 148 include a plurality of key indicia 150, 152, 154, 156 designating the particular keys to be struck during the exercise. Base indicia 146 and supplementary indicia 148 are configured to designate the keys necessary to play the exercise in a major scale. For purposes of illustration, the ends of device 130 are shownas broken away, but it is to be understood that the remaining keys in a major scale will be shown.

The second series of supplementary indicia is shown generally at 160 on the left-hand side of instruction device 130. Supplementary indicia 160 are placed on the left-hand side of instruction device 130 and include a plurality of key indicia 162, 164, 166, 168, 170 spaced to designate the keys necessary to produce a major scale. It will be apparent that the scale may be played by starting with the leftmost key on both the right and left-hand portions of instruction device 130 and sequentially playing the keys with each hand.

Figure 8:
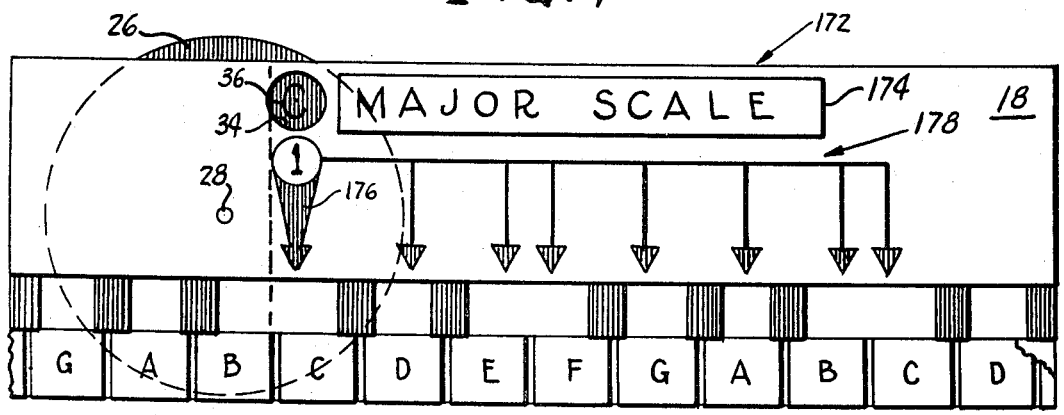
FIGURE 8 is a front elevational view of an embodiment very similar to FIGURE 1.

Referring now to FIGURE 8, another embodiment of the instant invention is illustrated generally at 172 for designating the keys to be struck in playing the major scale exercise as designated by title block 174. A comparison of FIGURES 1 and 8 will reveal a striking similarity with like reference characters being used to illustrate components of the instant embodiment which have been previously discussed elsewhere. Immediately below opening 34 is a base indicia 176 utilized to position undersheet 18 correctly in accordance with the key denominated by indicia 36 visible through opening 34.

As in all previous embodiments, base indicia 176 is positioned immediately below opening 134 to correlate the key designated by indicia 36 with the same key on the keyboard. A series of supplementary indicia shown generally at 178 differ from the supplementary indicia shown in FIGURE 1 by the omission of indicia 40, 48, 52, 56, 60, 64, 68, 72 to make the construction of device 172 simpler. It will be evident that the aforementioned indicia are merely a means to appropriately position the key designating indicia and may be omitted for purposes of simplicity.

Figure 9:
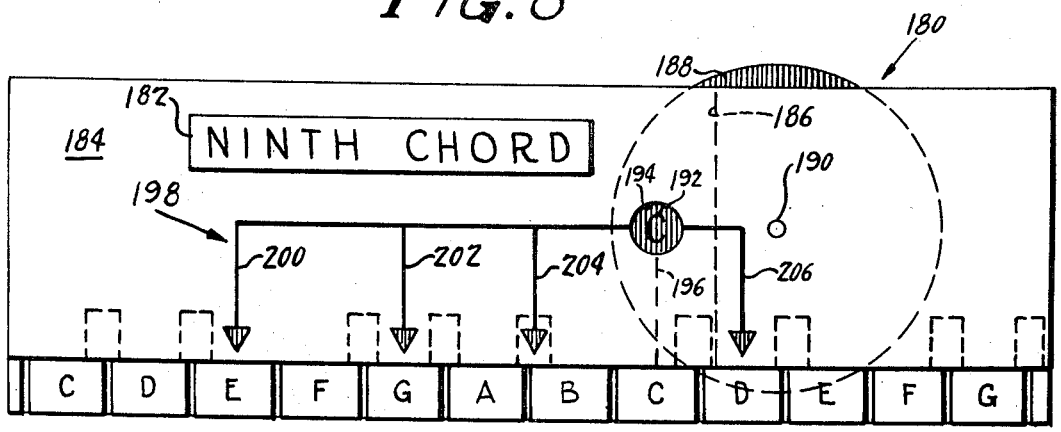
FIGURE 9 is a front elevational view of still another embodiment designating the keys to be struck to produce a ninth chord.

Referring now to FIGURE 9, another form of the instant invention is illustrated generally at 180 for designating the keys to be struck in the production of a ninth chord as indicated by panel block 182. Keyboard instruction device 180 includes a planar sheet of material 184 having the rightmost end reverted to form an edge 186. A key selection disc 188 is rotatably mounted about a pivot pin 190 and carries a plurality of chord designating indicia 192 visible through an opening 194 in sheet 184. A base indicia 196 extends downwardly from opening 194 to designate the key in which the chord is played. A series of supplementary indicia 198 includes a number of key designating indicia 200, 202, 204, 206 to designate the particular keys to be struck. It should be noted that in the use of instruction device 180, the key designated by base indicia 196 is not to be struck.

An important feature included in all embodiments of the instant invention resides in the correlation of the base indicia with the means for designating the key in which the exercise is to be played. For example, in FIGURES 1 to 9 inclusive, apertures 34, 134, 194 are positioned immediately above the respective base indicia. This allows the student to correlate the key in which the exercise is to be played with some guidepost on the keyboard in a direct and indicative manner. It should be understood, however, that the instant invention is not limited to a positioning of the base indicia immediately below the exposing aperture if some intermediate means, such as an arrow or the like, are used for directly indicatively correlating the base indicia with the aperture through which the key designating the indicia is visible.

It is now seen that there is herein provided an improved keyboard instruction device which accomplishes all of the objects of the instant invention and others, including many advantages of great practical utility and commercial importance.

Since many embodiments may be made of the instant inventive concept, and since many modifications may be made in the embodiments hereinbefore shown and described, it is to be understood that the foregoing is to be interpreted merely as illustrative and not in a limiting sense.

I claim:
1. A device for indicating to an individual studying a keyboard instrument to designate the appropriate keys to strike for a given exercise comprising:
   a planar sheet of material having one end reverted along a transverse fold line to overlie a portion of the sheet, the sheet forming an opening above the longitudinal center line thereof;

a rotatable disc positioned between the sheet and the reverted end and extending above the upper edge of the sheet;

an axle forming member securing the planar sheet and the reverted end together, the disc forming a central opening receiving the rivet;

a plurality of radially spaced indicia on the disc spaced to register with the opening, the opening being spaced from the transverse fold line to overlie the disc, the indicia designating the key in which the exercise is to be played;

a base indicia, immediately below the opening, for designating the base key to be struck as shown by the indicia visible through the opening; and a plurality of supplementary indicia, similar to the base indicia, spaced away from the base indicia and the transverse fold line for designating the remaining keys to be struck.

2. The device of claim 1 wherein the terminus of the reverted end lies between the rivet and the portion of the circumference of the disc spaced furthest from the transverse fold line to minimize the use of materials.

3. The device of claim 2 wherein the axle forming member is spaced along a line perpendicular to the transverse fold line a distance slightly greater than the radius of the disc.

4. The device of claim 3 wherein the diameter of the disc is larger than the transverse dimension of the planar sheet and wherein the axle forming member is above the longitudinal center line of the sheet.

5. The device of claim 4 wherein the central opening of the disc is slightly larger than the axle facilitating rotation of the disc.

6. A device for indicating to an individual studying a keyboard instrument to designate the appropriate keys thereon to strike for a given exercise comprising:

a planar sheet of material having at least one opening therein and means for supporting the device behind the keys of the instrument;

a rotatable disc mounted on the rear of the sheet covering the opening;

the planar sheet having a portion extending a substantial distance laterally of the disc;

a plurality of radially spaced pitch designating indicia on the disc to register with the opening, the indicia designating the pitch in which the exercise is to be played;

a base key indicia, on the sheet, for designating on the instrument itself the base key indicated by the pitch designating indicia, the base indicia and the opening being directly indicatively correlated to designate the base key from the visible indicia; and a plurality of spaced supplementary key indicia on the laterally extending portion so that when the device is positioned behind the keys of a keyboard instrument and the base key indicia is aligned with the base key on the instrument itself, the supplementary key indicia designate on the instrument itself the remaining keys to be struck.

7. The device of claim 6 wherein the base indicia is immediately below the opening.

8. The device of claim 6 wherein the planar sheet comprises another portion extending a substantial distance laterally of the disc in the opposite direction from the first mentioned portion; and further including a second series of supplementary key indicia, on the said another portion, designating on the instrument itself the keys to be struck;

the base indicia lying between the first and second series of supplementary indicia;

the first and second supplementary key indicia providing a treble key indicating means and a bass key indicating means.

9. The device of claim 6 wherein the laterally extending portion extends to the right of the disc.

10. The device of claim 6 wherein the means for supporting the device comprises edge means slidably receivable behind the keys of the instrument.

References Cited

UNITED STATES PATENTS 2,542,235   2/1951   Clopton _____ 84—474

RICHARD B. WILKINSON, *Primary Examiner.*

GARY M. POLUMBUS, *Assistant Examiner.*